(12) United States Patent
Kinoshita

(10) Patent No.: US 9,576,211 B2
(45) Date of Patent: Feb. 21, 2017

(54) DEVICE, METHOD, AND STORAGE MEDIUM FOR MAGNETIC INK CHARACTER PEAK DETECTION AND RECOGNITION

(71) Applicant: SEIKO EPSON CORPORATION, Tokyo (JP)

(72) Inventor: Yoshiaki Kinoshita, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 620 days.

(21) Appl. No.: 13/933,692

(22) Filed: Jul. 2, 2013

(65) Prior Publication Data

US 2014/0010434 A1    Jan. 9, 2014

(30) Foreign Application Priority Data

Jul. 9, 2012   (JP) .................................. 2012-153293

(51) Int. Cl.
*G06K 9/18*    (2006.01)
(52) U.S. Cl.
CPC ..................... *G06K 9/186* (2013.01)
(58) Field of Classification Search
None
See application file for complete search history.

(56) References Cited

U.S. PATENT DOCUMENTS

| 5,026,974 | A  | * | 6/1991 | Franklin | ................ | G06K 9/186 235/449 |
|---|---|---|---|---|---|---|
| 8,121,384 | B2 | | 2/2012 | Nakamura | | |
| 8,340,390 | B2 | | 12/2012 | Nakamura | | |
| 2009/0324106 | A1 | * | 12/2009 | Nakamura | ............... | G07D 7/04 382/224 |

FOREIGN PATENT DOCUMENTS

| JP | 2004206362 | A | | 7/2004 |
|---|---|---|---|---|
| JP | 2009110448 | A | * | 5/2009 |
| JP | 2009169712 | A | | 7/2009 |
| JP | 2009289195 | A | | 12/2009 |
| JP | 2012159912 | A | | 8/2012 |
| JP | 2012168837 | A | | 9/2012 |
| JP | 2012174093 | A | | 9/2012 |
| JP | 2012185762 | A | | 9/2012 |
| JP | 2012185763 | A | | 9/2012 |
| JP | 2012198852 | A | | 10/2012 |

(Continued)

*Primary Examiner* — Chan Park
*Assistant Examiner* — Geoffrey E Summers
(74) *Attorney, Agent, or Firm* — Hauptman Ham, LLP

(57) ABSTRACT

The recognition rate is improved and recognition errors are suppressed when recognizing magnetic ink characters. When the magnetic ink character 101 one character before the target character to which a magnetic recognition process is applied is not recognized, the character recognition unit 80 of a check reader 1 detects a different peak in a specific range before and after the position of the peak detected as the first peak of the one preceding magnetic ink character 101 in the signal waveform data, extracts character waveform data for the one preceding magnetic ink character 101 from the signal waveform data based on the position of the detected different peak, and applies the magnetic recognition process to the extracted character waveform data.

15 Claims, 14 Drawing Sheets

(56) References Cited

FOREIGN PATENT DOCUMENTS

| JP | 2012221276 A | 11/2012 |
|----|--------------|---------|
| JP | 2012221337 A | 11/2012 |
| JP | 2012226633 A | 11/2012 |
| JP | 2012243063 A | 12/2012 |
| JP | 2012252560 A | 12/2012 |

* cited by examiner

BOLD LINE: REFERENCE WAVEFORM DATA
THIN LINE: CHARACTER WAVEFORM DATA

DEVICE, METHOD, AND STORAGE MEDIUM FOR MAGNETIC INK CHARACTER PEAK DETECTION AND RECOGNITION

This application claims priority under 35 U.S.C. §119 to Japanese Patent Application No. 2012-153293 filed on Jul. 9, 2012, the entire disclosure of which is expressly incorporated by reference herein.

BACKGROUND

1. Technical Field

The present disclosure relates to a recording media processing device, a method of controlling a recording media processing device, and a non-transitory storage medium.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Recording media processing devices such as described in JP-A-2004-206362 detect the first peak exceeding a specific level that appears in the signal waveform data acquired by a magnetic ink character, and extract the character waveform data for one character in a range corresponding to one magnetic ink character based on the position of the first peak. The recording media processing device then applies a character recognition process that compares the waveform of the extracted character waveform data with reference waveform data for each character defined by a particular standard to recognize each magnetic ink character.

The magnetic waveform acquired by magnetically reading the magnetic ink characters can be distorted by the printing condition of the magnetic ink characters or a crease in the recording medium, for example, resulting in the first peak being lower than the specific level and not being detected as the first peak. When this happens, the next peak may be mistakenly detected as the first peak and the character waveform data for one character extracted from the wrong position.

Magnetic ink overspray is also found beside the MICR line on some recording media obtained through normal distribution channels. The inventor has noted, if ink overspray is at a position immediately before the read magnetic ink character, and the part of the signal waveform data corresponding to the ink overspray exceeds the specific level, the part where the ink overspray is found may be mistakenly detected as the first peak, and the character waveform data for one character mistakenly extracted from the wrong position.

When character waveform data for one character is extracted from the wrong position, the magnetic ink character cannot be correctly recognized, resulting in a recognition error, or resulting in the magnetic ink character being recognized as a different character as the inventor's observation. Another problem is that mistaking the extraction position of the character waveform data for one character results in the extraction positions of the character waveform data for the following characters also being wrong, the following characters not being recognized correctly, and the recognition rate dropping as the inventor's observation.

SUMMARY

The present disclosure provides a recording media processing device, control method, and non-transitory storage medium as described below.

A recording media processing device according to at least of one embodiment has a magnetic reading unit that magnetically reads a magnetic ink character recorded on a recording medium; and a character recognition unit that detects a first peak exceeding a specific level in signal waveform data read and acquired by the magnetic reading unit, extracts character waveform data from the signal waveform data in a range corresponding to one magnetic ink character in the magnetic ink character line based on the position of the detected first peak, applies a magnetic recognition process to the extracted character waveform data, and recognizes the magnetic ink character. The character recognition unit detects a different peak in a specific range before and after the position of the peak detected as the first peak of the one preceding magnetic ink character in the signal waveform data when the one preceding magnetic ink character before the target character processed in the magnetic recognition process could not be recognized; extracts character waveform data corresponding to the one preceding magnetic ink character from the signal waveform data based on the position of the detected different peak; and repeats the magnetic recognition process on the extracted character waveform data.

If there is character waveform data equal to one magnetic ink character before the target character and this one preceding magnetic ink character could not be recognized, at least of one embodiment looks for a different peak within a specific range before and after the position of the peak previously detected as the first peak, and based on the position of the detected different peak, extracts the character waveform data of the one preceding magnetic ink character. As a result, when the cause of the one preceding magnetic ink character not being recognized is because the first peak was mistakenly detected and the character waveform data was extracted from the wrong position, the correct first peak of the one preceding magnetic ink character can be detected again and the character waveform data can be extracted. By correctly extracting the character waveform data and repeating the magnetic recognition process, the one preceding magnetic ink character can be recognized. As a result, the recognition rate of the magnetic recognition process can be improved.

In a recording media processing device according to at least of one embodiment, the character recognition unit detects a lower peak than the specific level used to detect the first peak when detecting the different peak in the specific range.

When attempting to detect the correct peak of the one preceding magnetic ink character, at least of one embodiment detects a peak with a lower level (lower peak value) than the specific level previously used to detect the first peak. As a result, when the reason the correct first peak of the one preceding magnetic ink character could not be detected is because the first peak is clipped and below (has a lower peak value than) the specific level due to waveform distortion, the clipped first peak can be detected from a different peak of a lower level. The correct character waveform data can therefore be extracted and the magnetic recognition process executed using the correct first peak.

In a recording media processing device according to at least of one embodiment, when the character recognized by repeating the magnetic recognition process is a specific character, the character recognition unit determines that the acquired character is the one preceding magnetic ink character.

If the one preceding magnetic ink character recognized by repeating the magnetic recognition process is one of a group of specific characters, at least of one embodiment uses the result of the recognition process as the recognized character. The first peak in some magnetic ink characters is lower (the peak value of the first peak is lower) than the first peak in other characters. These characters are therefore more susceptible than the other characters to the first peak being clipped by waveform distortion, for example, to a level lower (lower peak value) than the specific level. However, detecting a peak with a lower level (lower peak value) than the specific level previously used to detect the first peak increases the risk of mistakenly detecting noise as a peak. Therefore, by using the character recognized by repeating the magnetic recognition process only if the character is one of the group of characters that are susceptible to the first peak being clipped and going below the specific level, the risk of mistakenly detecting noise as a first peak and mistakenly extracting character waveform data can be suppressed.

In a recording media processing device according to at least of one embodiment, the character recognition unit extracts character waveform data corresponding to the one preceding magnetic ink character from the signal waveform data when the target character is recognized if the position of the peak detected as the first peak of the magnetic ink character one before the target character is a specific distance or more from the position of the peak detected as the first peak of the target character.

When the target character is recognized, the first peak of the target character was conceivably correctly detected and the correct character waveform data extracted. In this instance, if the minimum distance between adjacent magnetic ink characters is defined as a specific distance, the position of the first peak of the one preceding magnetic ink character should be at least this specific distance from the position of the first peak of the target character. Because at least of one embodiment extracts character waveform data for the one preceding magnetic ink character if the distance between the position of the peak detected as the first peak of the one preceding magnetic ink character and the position of the first peak of the target character is at least the specific distance, extracting character waveform data from the wrong position can be suppressed.

Note that "distance" as used herein is the length on the x-axis of the waveform data as shown in FIG. 5A, and can be substituted by time, for example.

At least of one embodiment is a control method of a recording media processing device that has a magnetic reading unit that magnetically reads a magnetic ink character recorded on a recording medium, and a character recognition unit that detects a first peak exceeding a specific level in signal waveform data read and acquired by the magnetic reading unit, extracts character waveform data from the signal waveform data in a range corresponding to one magnetic ink character in the magnetic ink character line based on the position of the detected first peak, applies a magnetic recognition process to the extracted character waveform data, and recognizes the magnetic ink character, the control method including steps of: detecting a different peak in a specific range before and after the position of the peak detected as the first peak of the one preceding magnetic ink character in the signal waveform data when the one preceding magnetic ink character before the target character processed in the magnetic recognition process could not be recognized; extracting character waveform data corresponding to the one preceding magnetic ink character from the signal waveform data based on the position of the detected different peak; and repeating the magnetic recognition process on the extracted character waveform data.

If there is character waveform data equal to one magnetic ink character before the target character and this one preceding magnetic ink character could not be recognized, at least of one embodiment looks for a different peak within a specific range before and after the position of the peak previously detected as the first peak, and based on the position of the detected different peak, extracts the character waveform data of the one preceding magnetic ink character. As a result, when the cause of the one preceding magnetic ink character not being recognized is because the first peak was mistakenly detected and the character waveform data was extracted from the wrong position, the correct first peak of the one preceding magnetic ink character can be detected again and the character waveform data can be extracted. By correctly extracting the character waveform data and repeating the magnetic recognition process, the one preceding magnetic ink character can be recognized. As a result, the recognition rate of the magnetic recognition process can be improved.

In a control method according to at least of one embodiment, the step of detecting a different peak detects a lower peak than the specific level used to detect the first peak when detecting the different peak in the specific range.

Further preferably in a control method according to at least of one embodiment, when the character recognized by repeating the magnetic recognition process is a specific character, the step of repeating the magnetic recognition process determines that the acquired character is the one preceding magnetic ink character.

Further preferably a control method according to at least of one embodiment also has a step of extracting character waveform data corresponding to the one preceding magnetic ink character from the signal waveform data when the target character is recognized if the position of the peak detected as the first peak of the magnetic ink character one before the target character is a specific distance or more from the position of the peak detected as the first peak of the target character.

When the target character is recognized, the first peak of the target character was conceivably correctly detected and the correct character waveform data extracted. In this instance, if the minimum distance between adjacent magnetic ink characters is defined as a specific distance, the position of the first peak of the one preceding magnetic ink character should be at least this specific distance from the position of the first peak of the target character. Because at least of one embodiment extracts character waveform data for the one preceding magnetic ink character only if the distance between the position of the peak detected as the first peak of the one preceding magnetic ink character and the position of the first peak of the target character is at least the specific distance, extracting character waveform data from the wrong position can be suppressed.

At least of one embodiment is a non-transitory storage medium storing a program executed by a control unit that controls parts of a recording media processing device that has a magnetic reading unit that magnetically reads a magnetic ink character recorded on a recording medium, and a character recognition unit that detects a first peak exceeding a specific level in signal waveform data read and acquired by the magnetic reading unit, extracts character waveform data from the signal waveform data in a range corresponding to one magnetic ink character in the magnetic ink character line based on the position of the detected first peak, applies a magnetic recognition process to the extracted character waveform data, and recognizes the magnetic ink character, the program including steps of: detecting a different peak in a specific range before and after the position of the peak detected as the first peak of the one preceding magnetic ink character in the signal waveform data when the one preceding magnetic ink character before the target character processed in the magnetic recognition process could not be recognized; extracting character waveform data corresponding to the one preceding magnetic ink character from the signal waveform data based on the position of the detected different peak; and repeating the magnetic recognition process on the extracted character waveform data.

If there is character waveform data equal to one magnetic ink character before the target character and this one preceding magnetic ink character could not be recognized, at least of one embodiment looks for a different peak within a specific range before and after the position of the peak previously detected as the first peak, and based on the position of the detected different peak, extracts the character waveform data of the one preceding magnetic ink character. As a result, when the cause of the one preceding magnetic ink character not being recognized is because the first peak was mistakenly detected and the character waveform data was extracted from the wrong position, the correct first peak of the one preceding magnetic ink character can be detected again and the character waveform data can be extracted. By correctly extracting the character waveform data and repeating the magnetic recognition process, the one preceding magnetic ink character can be recognized. As a result, the recognition rate of the magnetic recognition process can be improved.

In the program stored on a non-transitory storage medium according to at least of one embodiment, the step of detecting a different peak preferably detects a lower peak than the specific level used to detect the first peak when detecting the different peak in the specific range.

In the program stored on a non-transitory storage medium according to at least of one embodiment, when the character recognized by repeating the magnetic recognition process is a specific character, the step of repeating the magnetic recognition process determines that the acquired character is the one preceding magnetic ink character.

The program stored on a non-transitory storage medium according to at least of one embodiment also has a step of extracting character waveform data corresponding to the one preceding magnetic ink character from the signal waveform data when the target character is recognized if there is character waveform data for one magnetic ink character before the target character and the position of the peak detected as the first peak of the magnetic ink character one before the target character is a specific distance or more from the position of the peak detected as the first peak of the target character.

Other objects and attainments together with a fuller understanding of at least of one embodiment will become apparent and appreciated by referring to the following description and claims taken in conjunction with the accompanying drawings.

DESCRIPTION OF EMBODIMENTS

Preferred embodiments of a recording media processing device, a method of controlling the recording media processing device, and a program according to the present embodiments are described below with reference to the accompanying figures. A recording media processing device according to at least of one embodiment is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
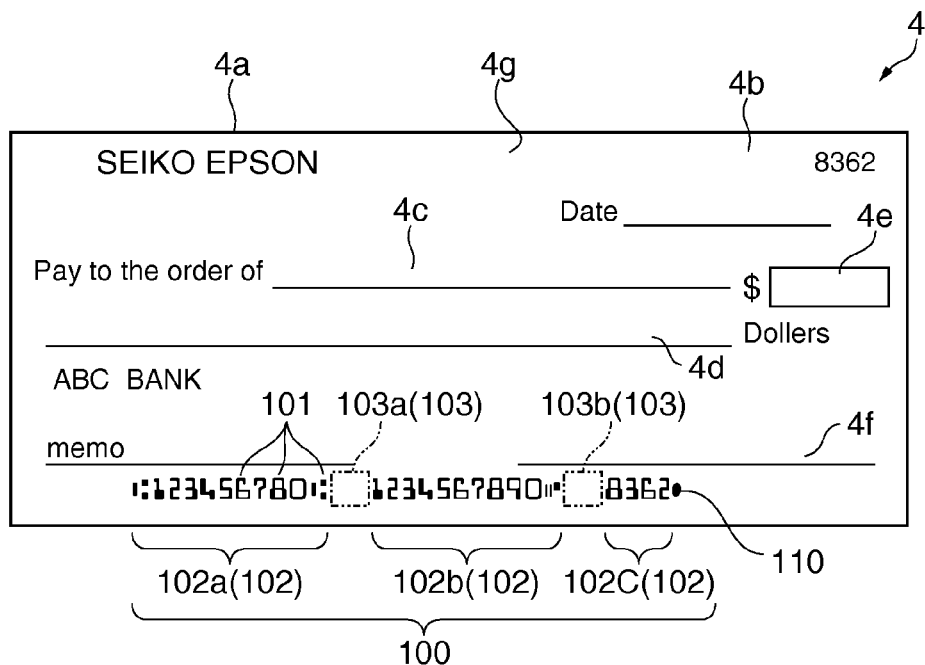
FIG. 1A shows an example of a check.
Figure 1B:
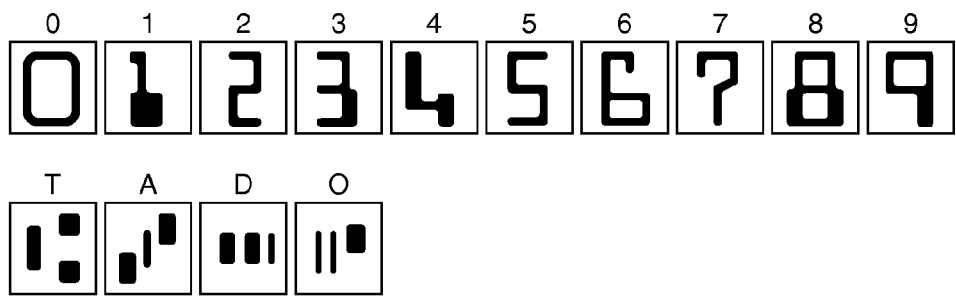
FIG. 1B shows examples of magnetic ink characters.

FIG. 1A shows an example of a check. FIG. 1B shows an example of magnetic ink characters. More specifically, FIG. 1A shows a check, and FIG. 1B shows the characters in the E-13B MICR font.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond to the bank number, account number, and check number from the left end of the line.

As indicated by the imaginary lines in FIG. 1A, a space character 103a is placed between fields 102 (102a and 102b), and a space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as the E-13B font), and one magnetic ink character 101 corresponds to one of plural predefined characters.

As shown in FIG. 1B, the E-13B font consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 by offset printing or laser printing. The actual shapes of the magnetic ink characters 101 in the E-13B font produced by offset printing, and the magnetic ink characters 101 in the E-13B font produced by laser printing, may differ.

The print quality of the magnetic ink characters 101 is poor (such as smeared magnetic ink characters) on some checks 4, however, and the check form 4a may have been folded or creased. Ink overspray 110 can also appear where magnetic ink mist sticks when printing the MICR line 100 in magnetic ink on the check form 4a. The recognition rate can drop and recognition errors occur during magnetic character recognition of the MICR line 100 on such checks 4.

Recording Media Processing Device

A recording media processing device according to at least of one embodiment is described next. A recording media processing device according to at least of one embodiment includes a check reader 1 and host computer 70.

Figure 2:
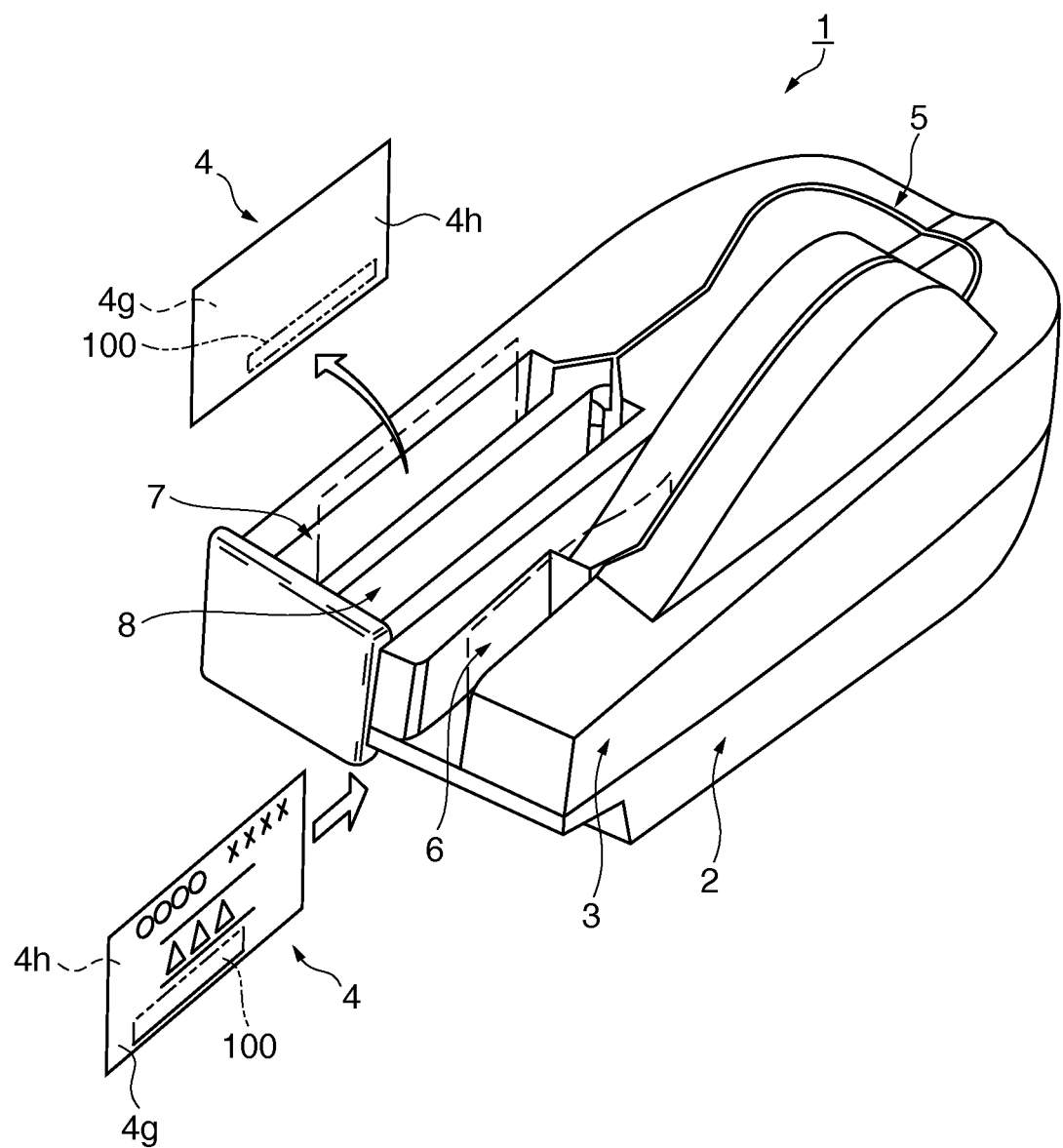
FIG. 2 is an oblique view of a check reader.

The basic configuration of a check reader 1 according to at least of one embodiment is described first. FIG. 2 is an oblique view of the check reader 1 according to at least of one embodiment. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
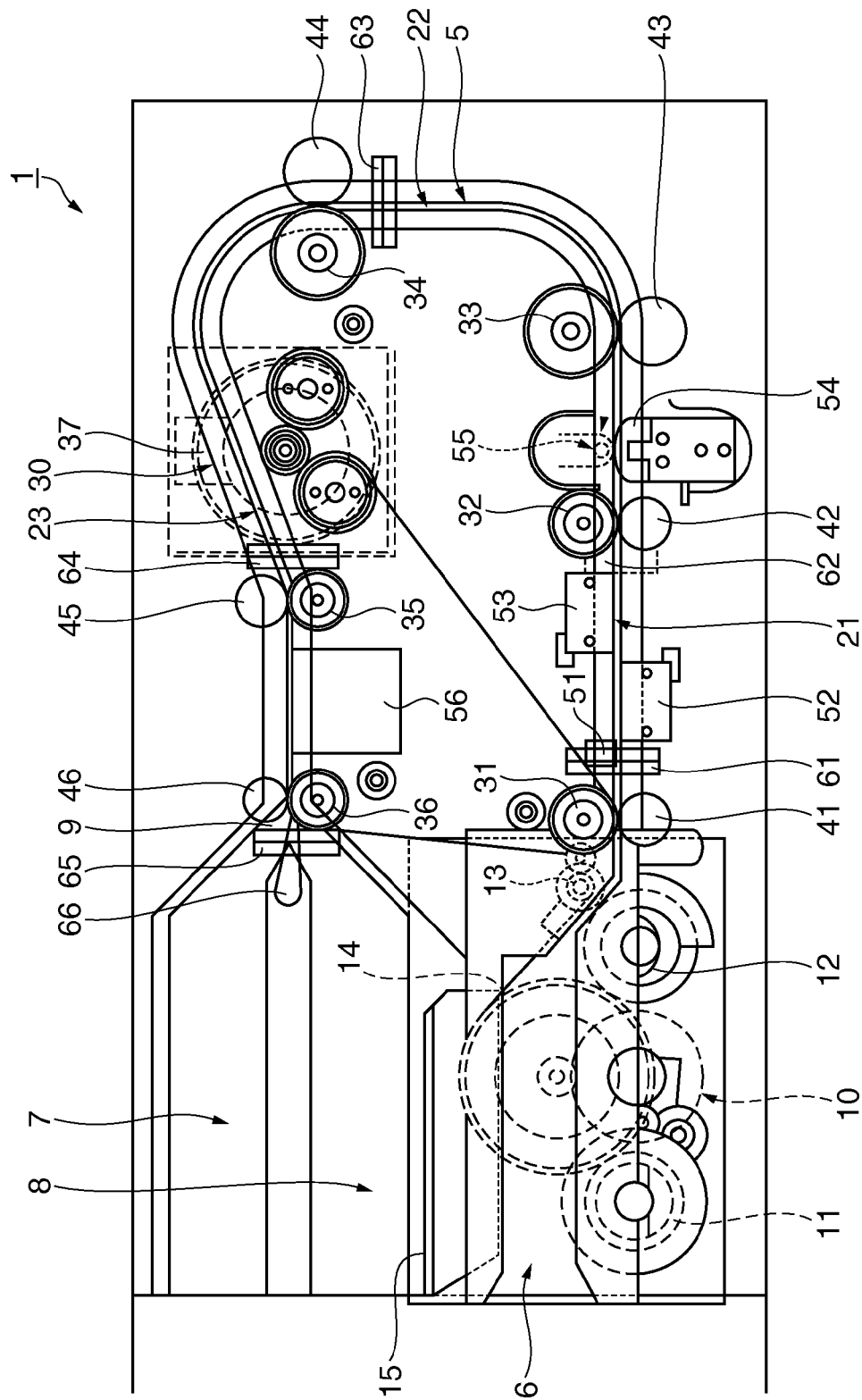
FIG. 3 shows an example of the internal configuration of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4g of the check 4 conveyed through the conveyance path 5, and scans a front image, which is an image of the front 4g. The back contact image sensor 53 faces the back 4h of the check 4 conveyed through the conveyance path 5, and scans a back image, which is an image of the back 4h.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density of the magnetized MICR line 100 at a specific sampling period to acquire signal waveform data as the recording medium is conveyed past the magnetic head 54.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead (including an inkjet head) or stamp capable of recording a specific image in an appropriate direction at a suitable position on the back 4h of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
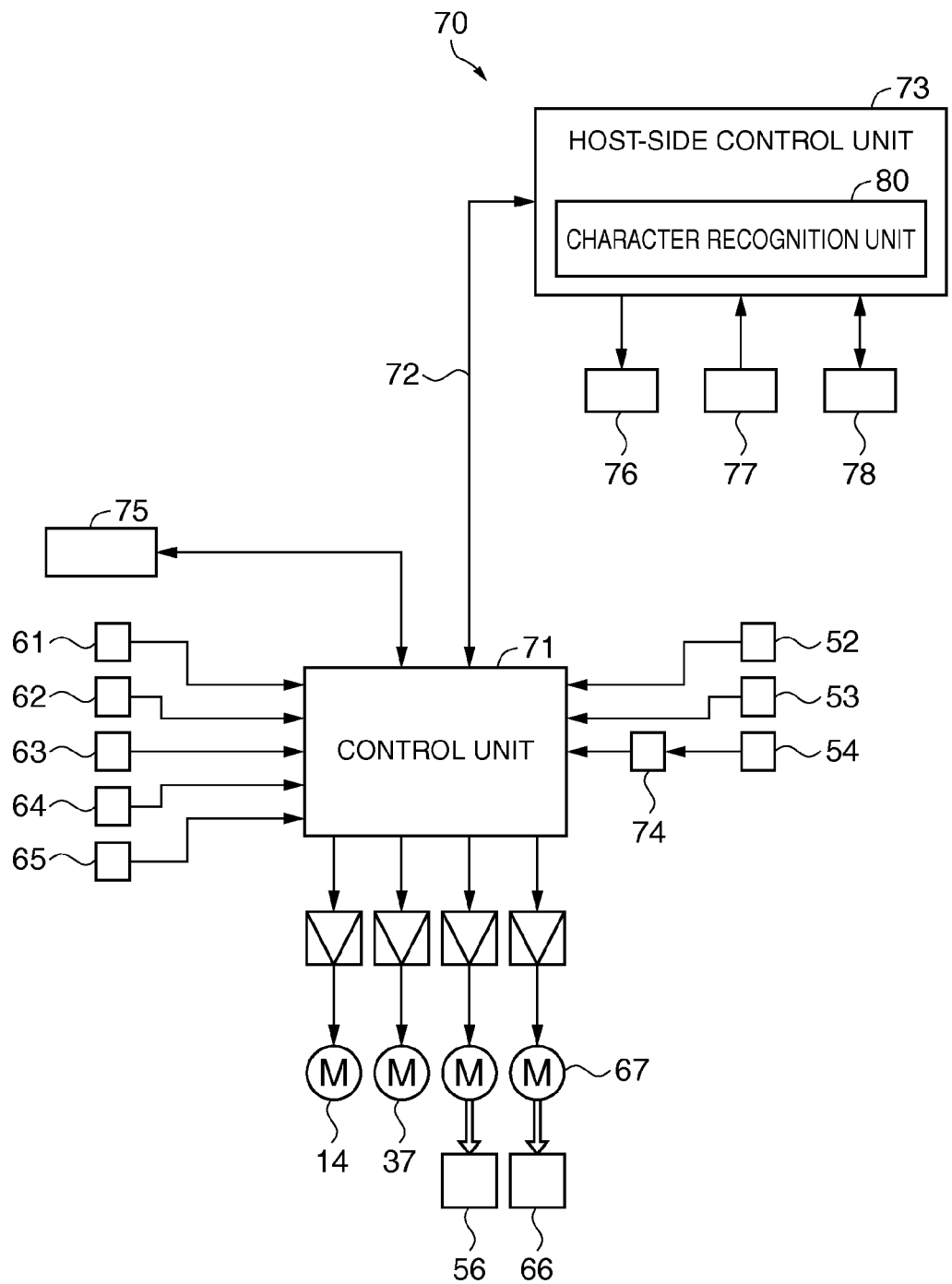
FIG. 4 is a block diagram showing an example of the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and wave-shapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In at least of one embodiment the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data (commands) for controlling the control unit 71, and outputting the resulting control data to the control unit 71 of the check reader 1. The host computer 70 and check reader 1 in at least of one embodiment thus cooperate to function as a recording media processing device for processing checks 4 as the recording medium.

Using a check 4 for a business transaction is described briefly next. The buyer of some product writes the date, payee, amount (in numbers and words), and signature in the fields 4b, 4c, 4d, 4e, 4f of the check form 4a (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 applies a character recognition process to each magnetic ink character 101 in the MICR line 100. Character recognition refers to identifying (recognizing) each magnetic ink character 101 in the magnetic ink characters 101 that were read, or determining that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 as the check 4 travels through the conveyance path 5 as described above. The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
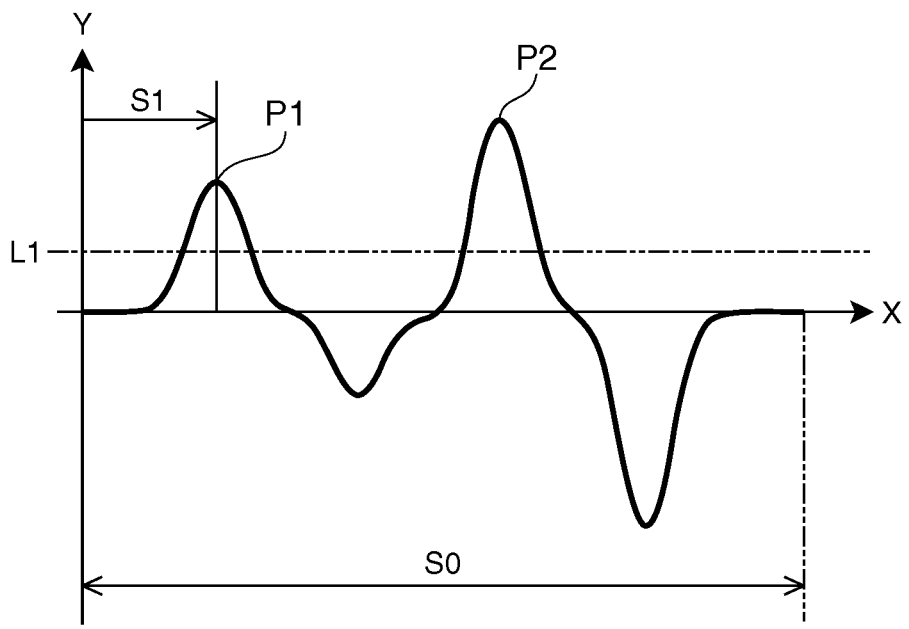
FIG. 5A shows an example of character waveform data.
Figure 5B:
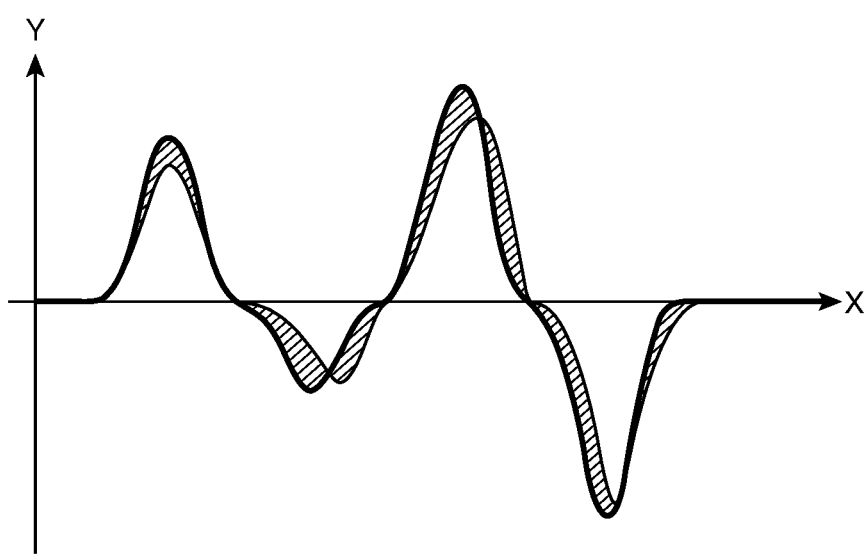
FIG. 5B shows an example of the difference between character waveform data and reference waveform data.

FIG. 5A shows an example of character waveform data. More specifically, FIG. 5A shows the character waveform data for one character in the magnetic ink character 101 set. FIG. 5B describes the difference between the character waveform data and reference waveform data. FIG. 5A and FIG. 5B show the character waveform data for the number 4.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and the distance of 0.013 inch is referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time, and the signal level where there is no change in magnetic flux is the origin (0 level).

Relative change in magnetic flux density during each specific sampling period is shown in FIG. 5A from the origin to the right on the x-axis (from the right side to the left side of the number 4 shown in FIG. 1B). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that first peak P1, which is the first peak that appears, is at specific period S1 from the position where character extraction starts in the character waveform data for one character.

The character recognition unit 80 analyzes the signal waveform data, and of the waveform peaks that exceed a specific level L1, detects the first peak that appears in the direction of the end of the waveform (to the right on the x-axis) as the first peak P1.

A peak is a high or low point in the signal waveform data, and these peaks appear at a specific period along the x-axis. Peaks on the positive side are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first peak P1 is at the position length S1 from the origin on the x-axis of the extracted waveform. The character recognition unit 80 then extracts the character waveform data in the length S0 occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters.

The character recognition unit 80 then recognizes each of the magnetic ink characters 101 in the MICR line 100 from the extracted character waveform data based on specific recognition conditions. The magnetic ink character 101 recognition process either identifies the magnetic ink character 101 that was read, or determines that character recognition is not possible. Character recognition is further described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

If the difference between the character waveform data and the reference waveform data used as the first candidate is less than or equal to the threshold, and the difference between the character waveform data and the reference waveform data used as the second candidate is greater than the threshold, the character recognition unit 80 determines that the magnetic ink character 101 was recognized, and confirms the character selected as the first candidate as the recognized character obtained by character recognition.

The threshold used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

Signal Waveform Distortion

Figure 6A:
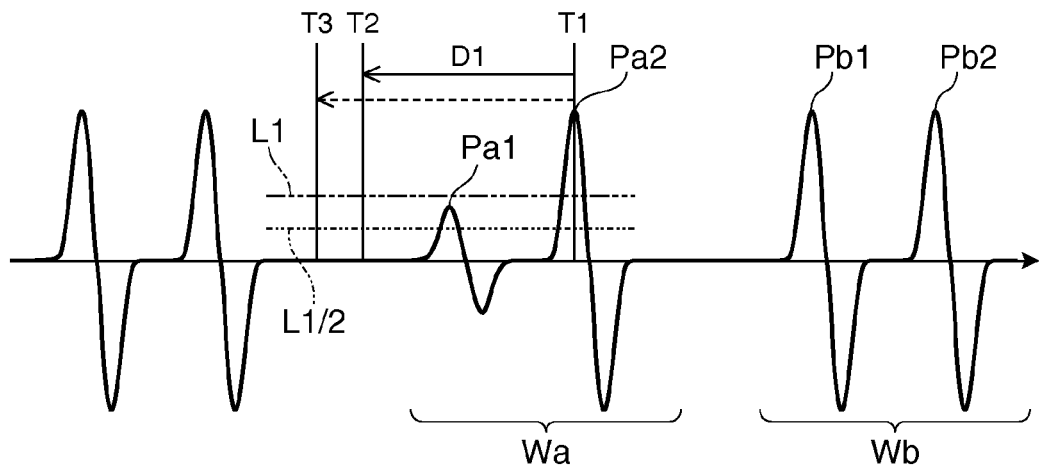
FIG. 6A shows an example of reference waveform data with waveform distortion.
Figure 6B:
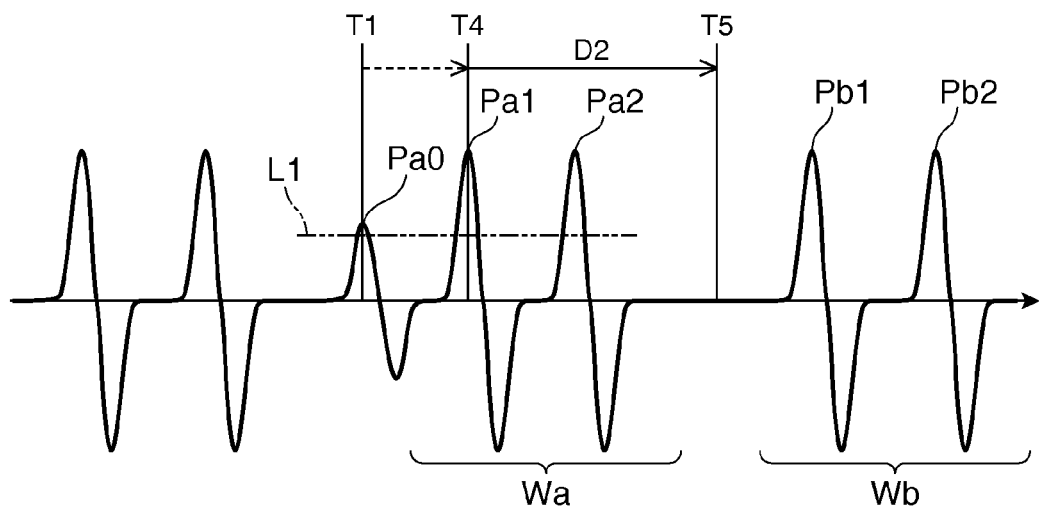
FIG. 6B shows another example of reference waveform data with waveform distortion.

Distortion can also appear in the waveform of the signal waveform data obtained by reading with the magnetic head 54. FIG. 6A and FIG. 6B show examples of signal waveform data with waveform distortion. More specifically, FIG. 6A shows signal waveform data in which a peak has been clipped, and FIG. 6B shows signal waveform data containing noise. FIG. 6A and FIG. 6B show a portion of the signal waveform data acquired by reading with the magnetic head 54 corresponding to three magnetic ink characters 101.

Figure 7A:
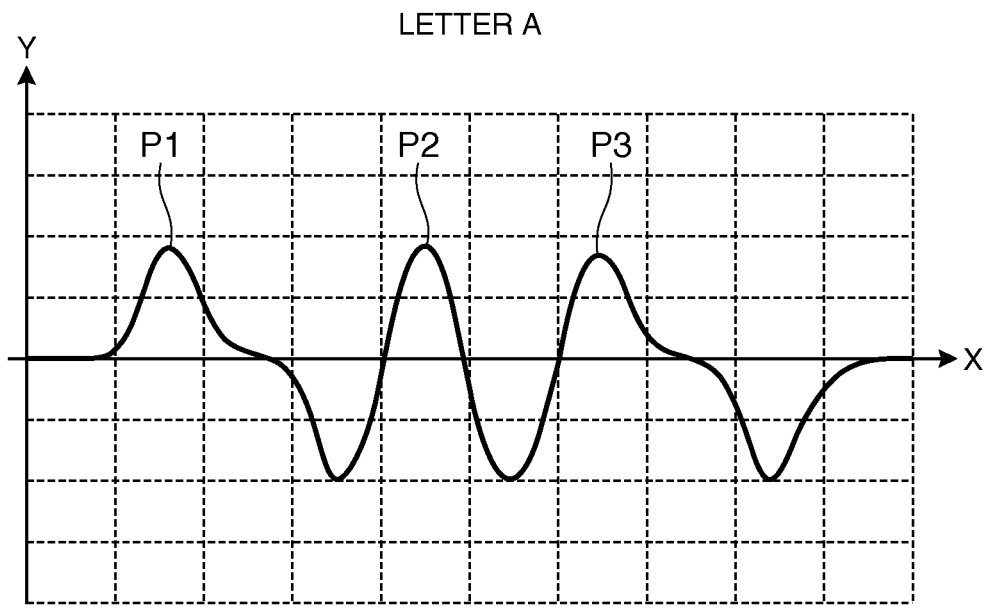
FIG. 7A shows an example of reference waveform data for a particular character.
Figure 7B:
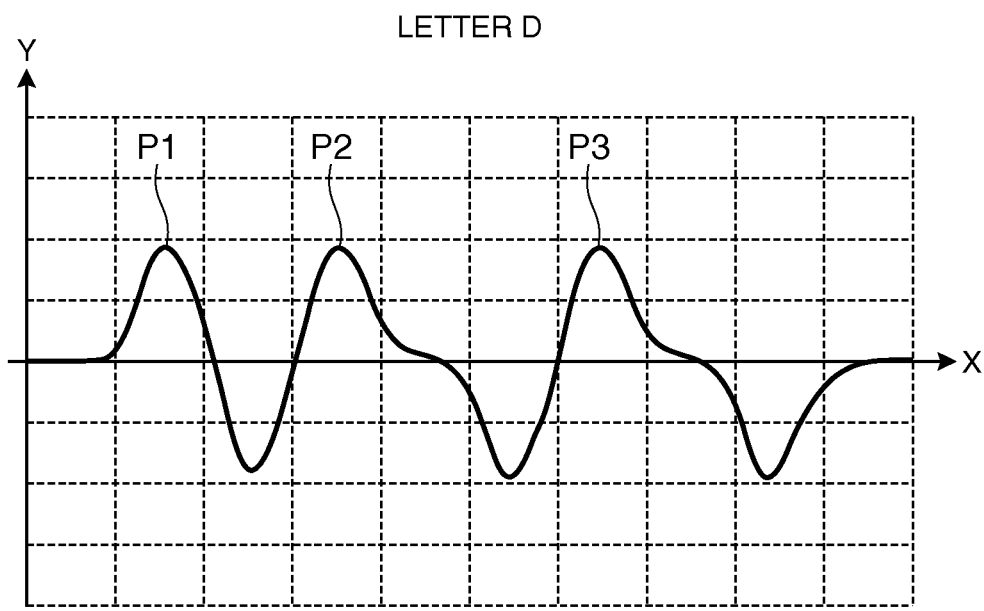
FIG. 7B shows another example of reference waveform data for a particular character.
Figure 8:
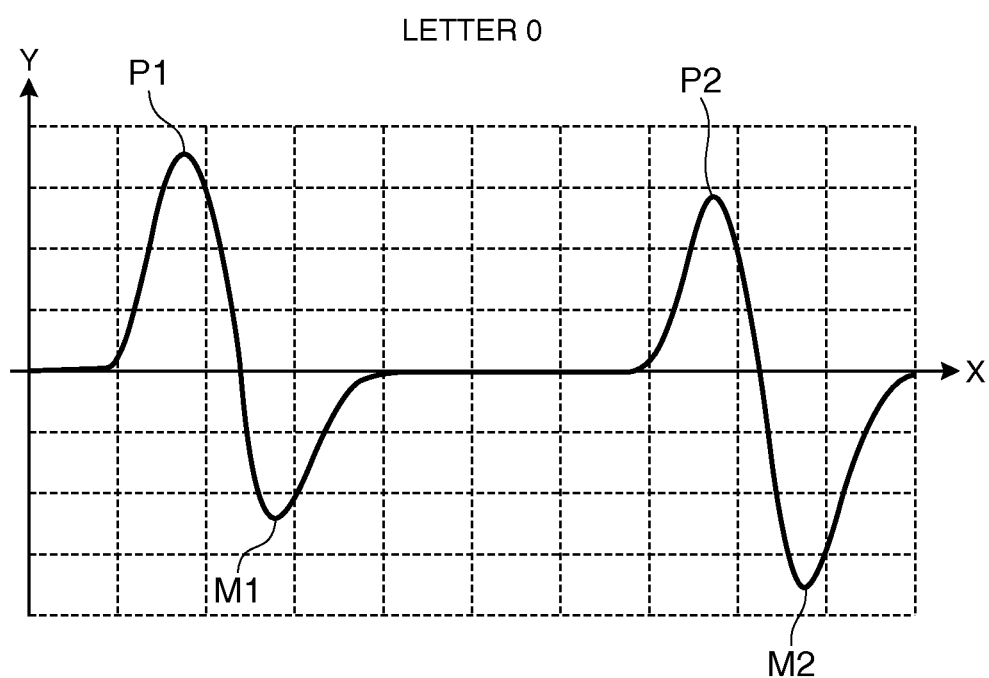
FIG. 8 shows another example of reference waveform data for a particular character.
Figure 9A:
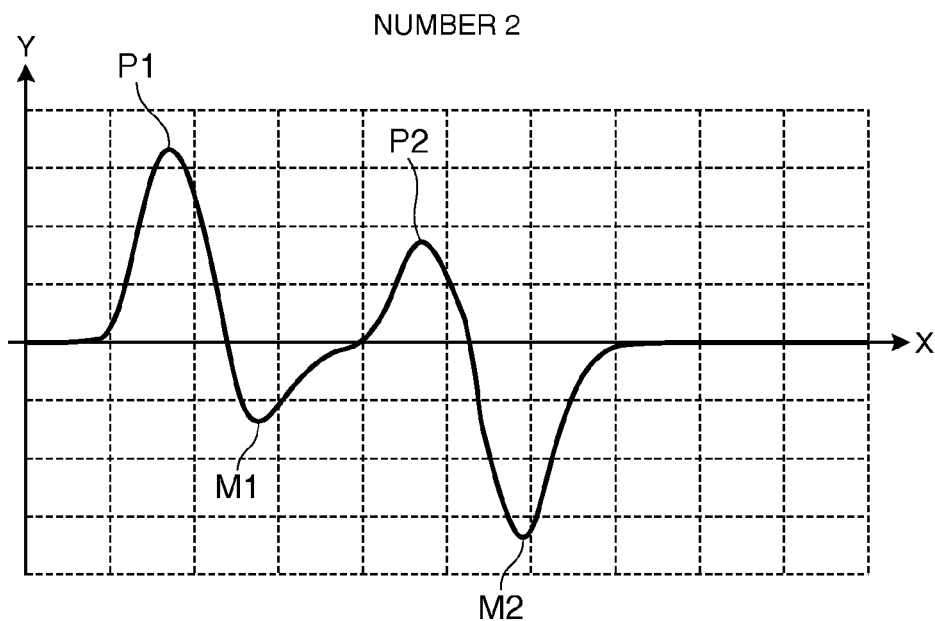
FIG. 9A shows another example of reference waveform data for a particular character.
Figure 9B:
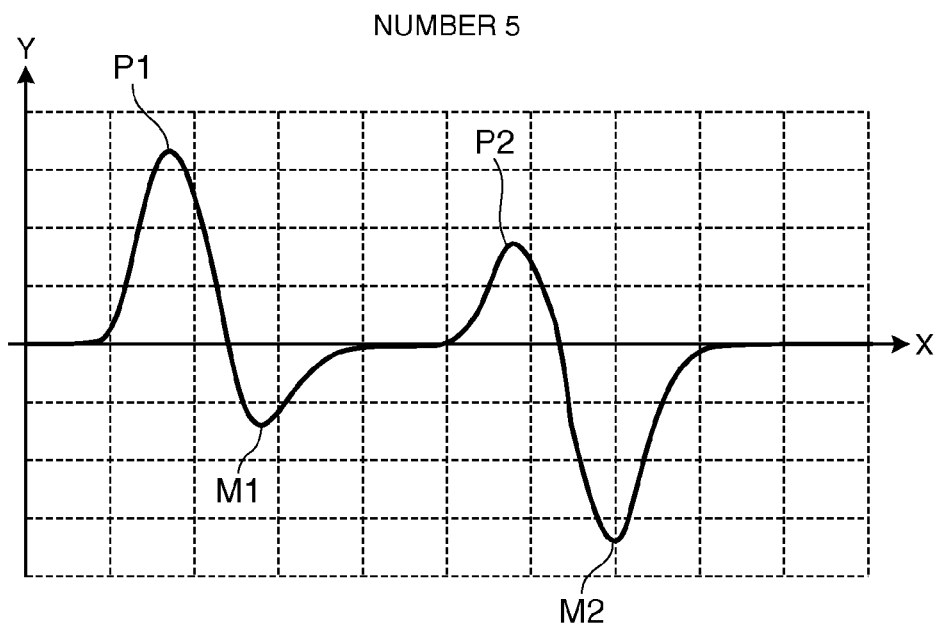
FIG. 9B shows another example of reference waveform data for a particular character.

FIG. 7A, FIG. 7B, FIG. 8, FIG. 9A, and FIG. 9B show examples of reference waveform data for particular characters. More specifically, FIG. 7A shows reference waveform data for the amount symbol A, and FIG. 7B shows reference waveform data for the dash symbol D, FIG. 8 shows reference waveform data for the number 0, FIG. 9A shows reference waveform data for the number 2, and FIG. 9B shows reference waveform data for the number 5.

Peak clipping in the signal waveform data is described next with reference to FIG. 6A. The second waveform period Wa from the left in FIG. 6A equals one magnetic ink character 101, and has a first peak Pa1 and a second peak Pa2. The third waveform period Wb from the left also equals one magnetic ink character 101, and has a first peak Pb1 and a second peak Pb2.

The first peak Pa1 is clipped in the waveform period Wa second from left, and the signal level of the first peak Pa1 is lower (smaller) than the specific level L1. This sort of clipping occurs when the waveform is distorted by poor printing or smearing of the magnetic ink character 101, or folding the check form 4a, for example. Note that the signal level of a peak being lower than the normal value, such as shown in first peak Pa1, is referred to as "peak clipping," and a peak with a lower than normal peak value is referred to as a "clipped peak."

In the example shown in FIG. 6A, the level of first peak Pa1 is less than specific level L1, first peak Pa1 is therefore not detected as the first peak, and second peak Pa2, which is the next peak after first peak Pa1, is detected as the first peak. When this happens, the waveform data of the first character will be extracted from the wrong start character extraction position based on the position of second peak Pa2 and not first peak Pa1, and the waveform from a point in waveform period Wa, which includes second peak Pa2, to a point in waveform period Wb will be extracted as the character waveform data of one character.

The level of first peak P1 in the signal waveform data of the number 4 shown in FIG. 5A, the amount symbol A shown in FIG. 7A, the dash symbol D shown in FIG. 7B, and the number 1 and On-Us symbol O (not shown) is lower than the level of first peak P1 in the signal waveform data of the other characters. As a result, these characters are more easily affected by the level of first peak P1 dropping due to waveform distortion than the other characters.

What happens when noise is in the signal waveform data is described next with reference to FIG. 6B. The signal waveform data shown in FIG. 6B has a peak Pa0 caused by noise immediately before (on the left side of) first peak Pa1 in waveform period Wa. When there is ink overspray 110 as shown in FIG. 1A, for example, this noise peak Pa0 results from the magnetic head 54 reading the magnetized ink overspray 110.

Even when there is ink overspray 110, the waveform portion corresponding to the ink overspray 110 will be separated from the waveform portion corresponding to the magnetic ink character 101 in the captured signal waveform data, and can be easily detected, if the ink overspray 110 is greater than the width of one character from the closest magnetic ink character 101. However, if the ink overspray 110 is closer than one character width to the beginning of the next magnetic ink character 101 in the reading direction, a peak Pa0 caused by noise results in the preceding waveform period Wa as shown in FIG. 6B.

If the level of peak Pa0 is greater than or equal to specific level L1, the peak Pa0 caused by ink overspray 110 will be mistakenly detected as the first peak. When this happens, character extraction will start from the wrong start character extraction position based on the position of peak Pa0 instead of first peak Pa1, and the waveform from a point including the peak Pa0 before waveform period Wa to a point in the waveform period Wa will be extracted as the character waveform data of one character.

If the position of peak Pa0 is after the position of first peak Pa1, first peak Pa1 will be detected as the first peak and characters can be extracted from the correct start character extraction position. However, if a peak Pa0 caused by ink overspray 110 is included in the character waveform data of one character, the difference with the reference waveform data will increase and character recognition is often not possible.

If the character waveform data is extracted from the wrong start character extraction position, recognition of the character waveform data may not be possible and the recognition rate will drop. Erroneous extraction can also result in the character waveform data being similar to the reference waveform data of a different character, possibly leading to a recognition error.

For example, in the reference waveform data for the number 0, the distance between the position of first peak P1 and the position of second peak P2 (the distance on the x-axis) is greater than in the reference waveform data of the other characters. For example, in the signal waveform data acquired by reading a MICR line 100 containing consecutive 0s, second peak P2 will be mistakenly detected as the first peak, and the character waveform data will be extracted from the wrong position. The mistakenly extracted character waveform data will be a waveform containing second peak P2 from the first number 0 and first peak P1 from the next number 0. The distance between second peak P2 in the first number 0 and first peak P1 in the next number 0 in this waveform is shorter than the distance between first peak P1 and second peak P2 in the reference waveform data for the number 0, resulting in a waveform resembling the reference waveform data of the number 2 shown in FIG. 9A and the reference waveform data of the number 5 shown in FIG. 9B. As a result, the number 0 may be mistakenly recognized as the number 2 or the number 5. Conversely, when the number 2 and the number 5 are consecutive to each other and the second peak is mistakenly extracted as the first peak, the distance between the second peak and the first peak P1 in the number 2 or number 5 in the extracted waveform will be substantially equal to the standard distance between characters, and the waveform may be mistakenly recognized as the number 0. The wrong extraction position can thus result in recognition errors.

As shown in FIG. 6A and FIG. 6B, when the start character extraction position of the character waveform data (waveform period Wa) for one magnetic ink character 101 is mistaken, searching for the first peak in the character waveform data (waveform period Wb) of the next magnetic ink character 101 starts from the wrong start character extraction position. As a result, the first peak is mistakenly detected and the character waveform data of the next character is also extracted starting from the wrong position. If the extraction position of the character waveform data is wrong for each of the following magnetic ink characters 101, the remaining magnetic ink characters 101 in the field 102 (see FIG. 1A) cannot be recognized, and the recognition rate drops significantly.

When magnetic character recognition of the target character has ended and recognition of the one preceding character could not be confirmed, this embodiment checks the start character extraction position of the one preceding character. If that start character extraction position may be wrong, this embodiment reprocesses the one preceding character from detection of the first peak P1 to character recognition.

Character Recognition Process

The character recognition process in the check reader 1 according to at least of one embodiment is described next. FIG. 10, FIG. 11, FIG. 12, FIG. 13, and FIG. 14 are flow charts describing the character recognition process in a check reader according to this embodiment.

Figure 10:
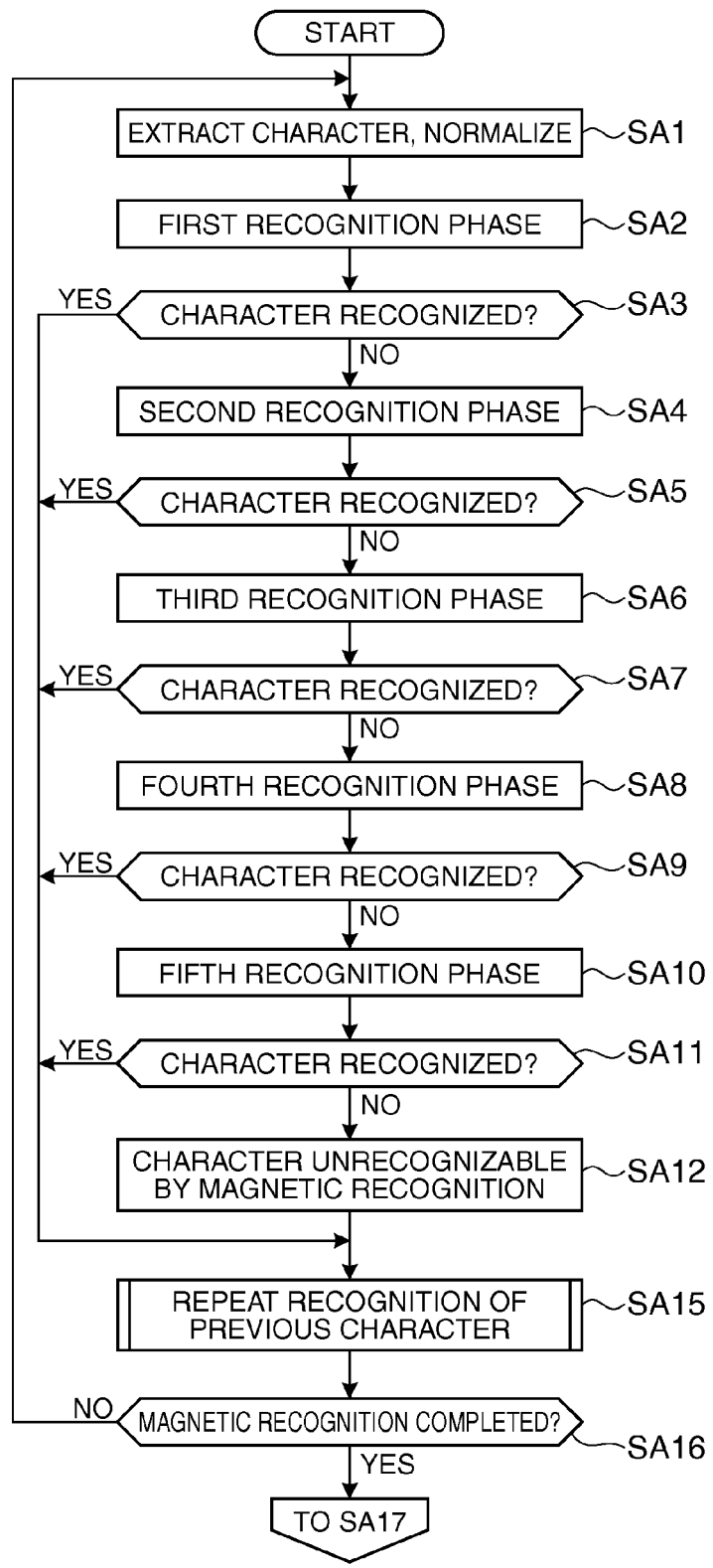
FIG. 10 is a flow chart describing an example of the character recognition process in a check reader.

The MICR line 100 recorded on the check 4 is read by the magnetic head 54 before step SA1 in FIG. 10. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first peak P1 (FIG. 5A) used as the reference for the start character extraction position is detected in the acquired signal waveform data. Based on the position of the detected first peak P1, the character recognition unit 80 extracts character waveform data for one character corresponding to a magnetic ink character 101 from the signal waveform data, and applies a normalization process to the extracted character waveform data.

The position where detection of first peak P1, which is the first peak in the signal waveform data, starts is a position a specific distance from the start character extraction position of the one preceding character.

The magnetic recognition process described from step SA2 below has five recognition phases from a first recognition phase in step SA2 to a fifth recognition phase in step SA10. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase.

If the target character cannot be recognized in these five recognition phases, the optical recognition process described below in step SA20 (FIG. 11) is applied to the target character.

If the target character was recognized (step SA3, SA5, SA7, SA9, or SA11 returns YES), the character recognition unit 80 goes to step SA15. If the target character could not be recognized (steps SA3, SA5, SA7, SA9, SA11 return NO), that is, recognition of the target character could not be confirmed in any of the first to fifth recognition phases, the character recognition unit 80 determines that the target character cannot be recognized by magnetic recognition (step SA12), and goes to step SA15.

In step SA15, the character recognition unit 80 attempts to recognize the one character before the target character to which the recognition process is currently applied. The process of step SA15 is described next with reference to FIG. 12, FIG. 13, and FIG. 14.

Figure 12:
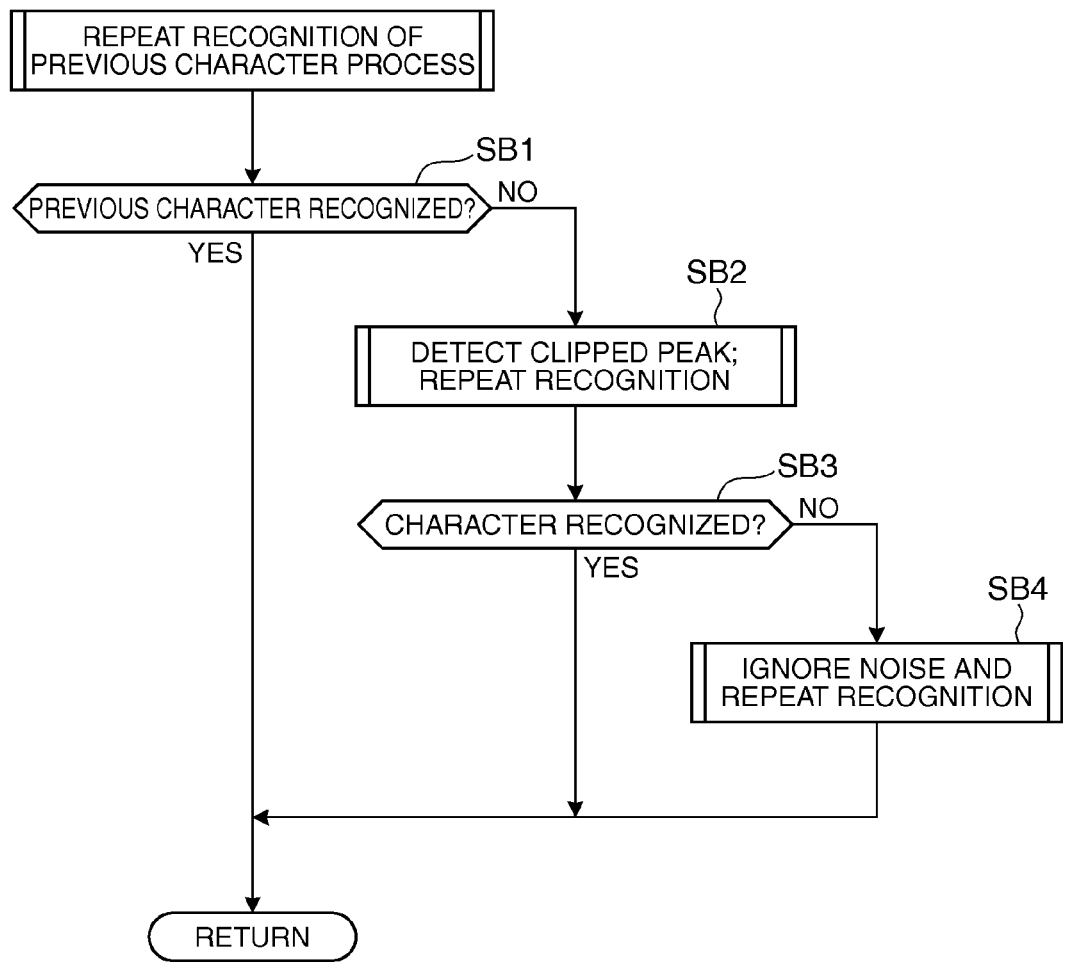
FIG. 12 is a flow chart describing an example of the character recognition process in a check reader.

As shown in FIG. 12, step SA15 includes a process of detecting a clipped peak and repeating character recognition in step SB2, and a process of ignoring noise and repeating character recognition in step SB4.

In step SB1, the character recognition unit 80 determines if the first character before the current target character was recognized. If this one preceding character was recognized, that is, recognition of the one preceding character was confirmed (step SB1 returns YES), the character recognition unit 80 skips the remaining steps and goes to step SA16 in FIG. 10. If this one preceding character could not be recognized (step SB1 returns NO), a clipped peak is detected and recognition is repeated in step SB2.

The process of detecting a clipped peak and repeating recognition in step SB2 is for detecting the correct first peak, re-extracting the character waveform data, and repeating character recognition when the one preceding character could not be recognized because the wrong first peak was detected due to the first peak in the one preceding character being clipped and the character waveform data being extracted from the wrong position.

Figure 13:
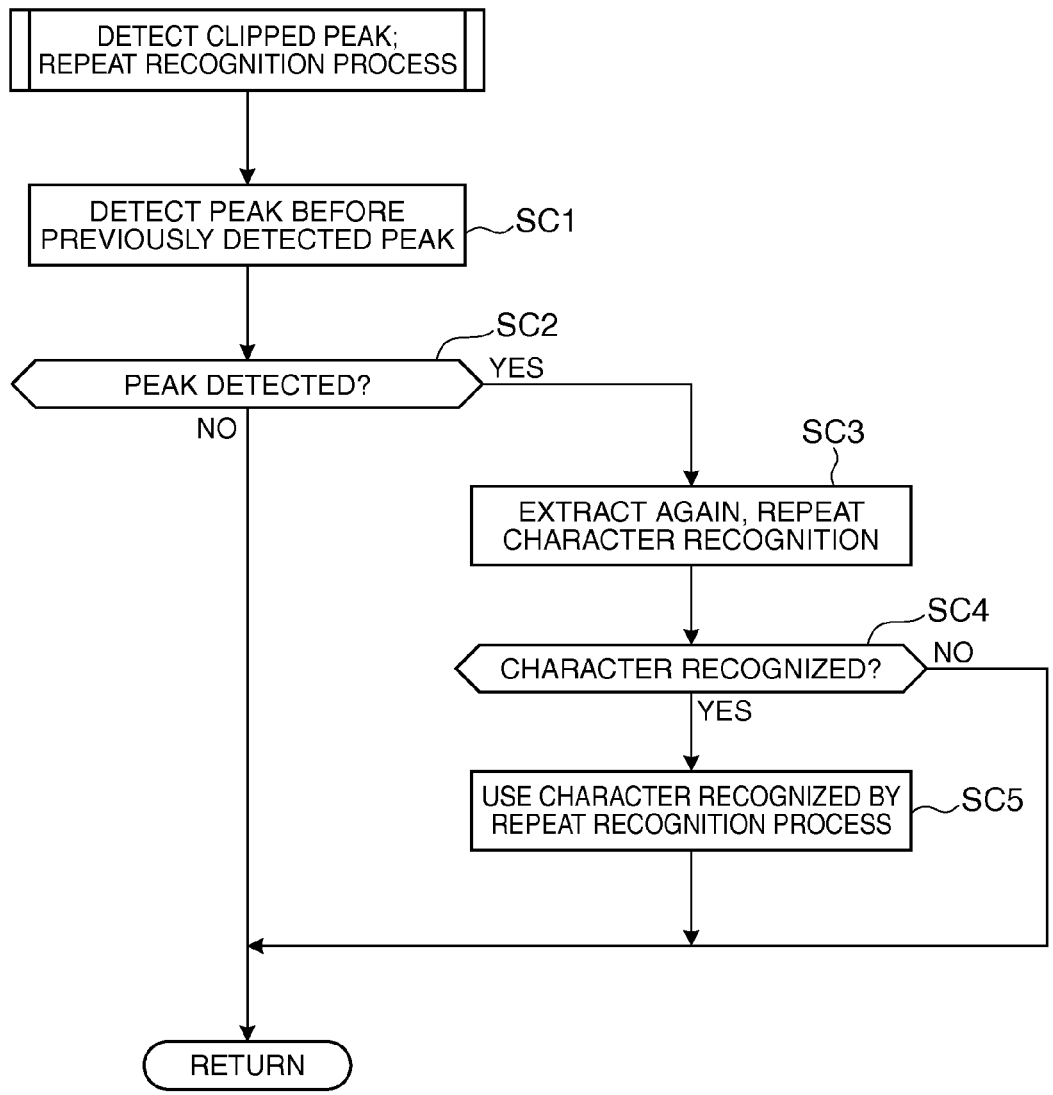
FIG. 13 is a flow chart describing an example of the character recognition process in a check reader.

The content of the process performed in step SB2 is described next with reference to FIG. 13. As shown in FIG. 13, step SB2 starts with a step SC1. Step SC1 is described with reference to FIG. 6A.

In FIG. 6A, waveform period Wb corresponds to the current target character, and waveform period Wa corresponds to the one preceding character. More specifically, because the first peak Pa1 in the one preceding character is clipped and is below specific level L1, first peak Pa1 cannot be detected as the first peak, second peak Pa2 is mistakenly detected as the first peak, and the start character extraction position for the character waveform data of the one preceding character is wrong.

In this instance, step SC1 looks for a peak before (on the left side in FIG. 6A) the position T1 of the second peak Pa2 detected as the first peak of the one preceding character.

The range in which the character recognition unit 80 looks for a peak in step SC1 is the range to position T1 from whichever of position T2 and position T3 is closer to position T1, where position T2 is a specific distance D1 before position T1 of the first peak (second peak Pa2) in the one preceding character, and position T3 is the position where detecting the first peak of the one preceding character started. In the example shown in FIG. 6A, position T2 is closer than position T3 to position T1, and the range from position T2 to position T1 is the range in which a peak is detected.

The character recognition unit 80 looks for a peak with a level between the specific level L1 and a level lower than specific level L1 (such as half of specific level L1). The character recognition unit 80 thus looks for a peak that is lower than specific level L1 and greater than half specific level L1. A maximum of 3 peaks are detected.

The amount symbol A shown in FIG. 7A and the dash symbol D shown in FIG. 7B are used for example. Both of these characters have three peaks, first peak P1, second peak P2, and third peak P3. In this example three peaks are detected in step SC1, that is, first peak P1 and two noise peaks.

In step SC2 in FIG. 13, the character recognition unit 80 then determines if a peak was detected in step SC1. If a peak was detected (step SC2 returns YES), the character recognition unit 80 proceeds to step SC3. If a peak could not be detected (step SC2 returns NO), the character recognition unit 80 goes to step SB3 in FIG. 12.

In step SC3, the character recognition unit 80 determines the start character extraction position of the one preceding character based on the position of the peak detected in step SC1 and extracts character waveform data, and applies character recognition to the extracted character waveform data (repeats the recognition process). As a result, in the example shown in FIG. 6A, character waveform data is extracted again using first peak Pa1 as the first peak, and the recognition process is repeated.

If plural peaks are detected in step SC1, character waveform data extraction and character recognition are repeated from the peak at the beginning of the signal waveform data (the left side in FIG. 6A). When a character is recognized using one peak, that character is used as the result of the repeat recognition process, and character waveform data extraction and recognition are not applied to the remaining peaks. The recognition process could be repeated for all peaks even when a character is recognized using one peak, but evaluation may conversely be more difficult if plural characters are recognized.

In step SC4, the character recognition unit 80 determines if character recognition was successful in the repeat recognition step SC3. If character recognition was successful (step SC4 returns YES), the character recognition unit 80 proceeds to step SC5.

In step SC5, the previous recognition result for the one preceding character is replaced with the result of step SC3. If the character could not be recognized (step SC4 returns NO), the character recognition unit 80 goes directly to step SB3 in FIG. 12. This completes clipped peak detection and repeat character recognition in step SB2.

Note that step SC4 preferably determines that the character was successfully recognized when the character recognized in the repeat recognition process of step SC3 is the number 1, number 4, amount symbol A, On-Us symbol O, or dash symbol D. Because there is the risk of mistakenly detecting noise as a peak in step SC1 as described above, the risk of recognition errors due to mistakenly detecting noise as a peak can be suppressed by limiting recognition to characters that are more easily affected than the other characters by clipping of the first peak P1 due to waveform distortion.

Referring again to FIG. 12, the character recognition unit 80 determines in step SB3 if character recognition was successful in the repeat recognition process of step SB2. If character recognition was successful (step SB3 returns YES), the character recognition unit 80 skips step SB4 and goes directly to step SA16 (FIG. 10). If character recognition was not successful (step SB3 returns NO), the character recognition unit 80 goes to step SB4 and executes a process that ignores noise and repeats recognition.

The process of ignoring noise and repeating recognition in step SB4 is a process of detecting the correct first peak, extracting character waveform data, and repeating character recognition when the reason the one preceding character could not be recognized is that noise in the signal waveform data was mistakenly detected as the first peak of the one preceding character and the character waveform data was extracted from the wrong position.

Figure 14:
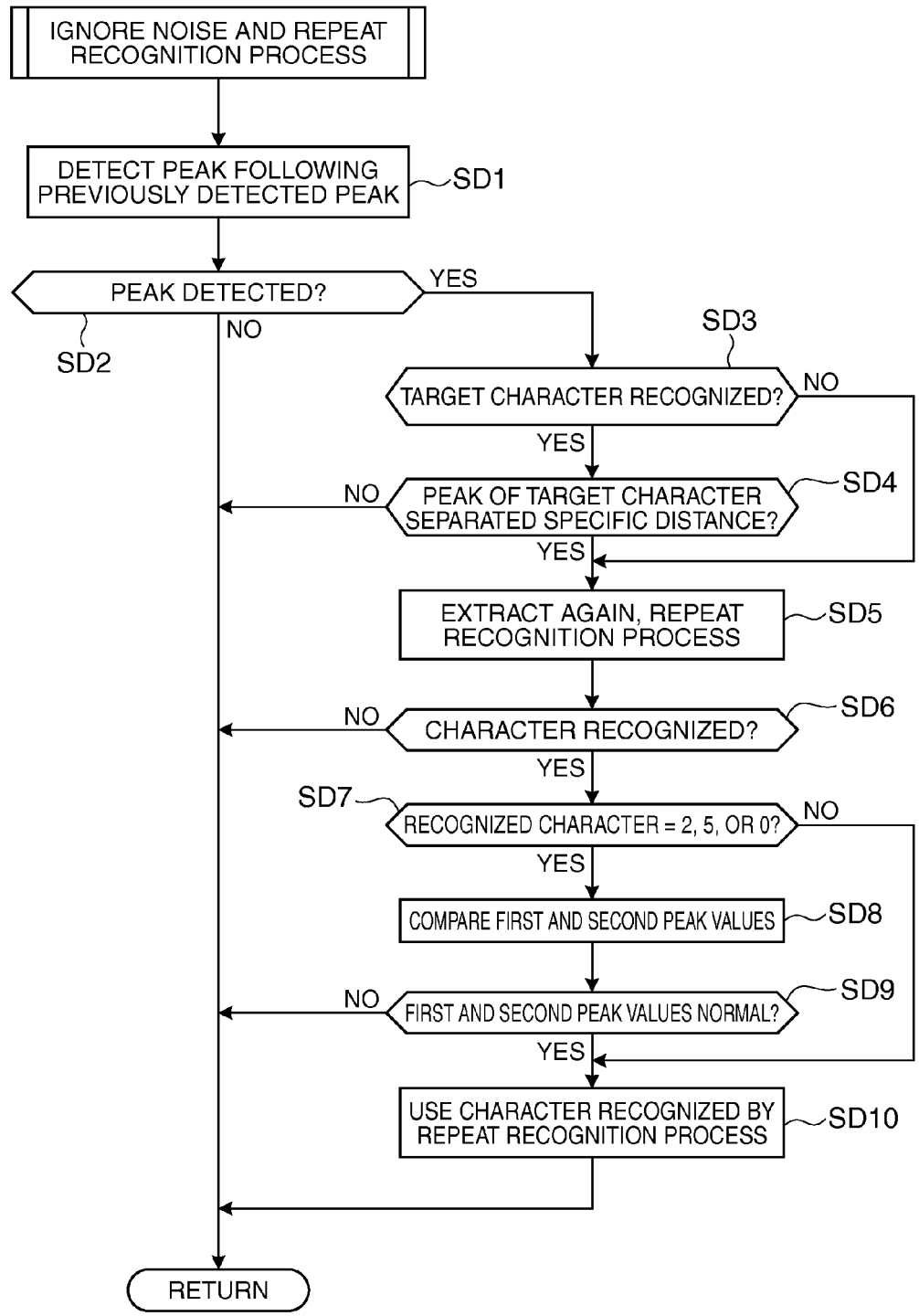
FIG. 14 is a flow chart describing an example of the character recognition process in a check reader.

The content of step SB4 is described next with reference to FIG. 14. As shown in FIG. 14, step SB4 starts with the process in step SD1. This step SD1 is described with reference to FIG. 6B.

In FIG. 6B, waveform period Wb corresponds to the current target character, and waveform period Wa corresponds to the one preceding character. More specifically, because a peak Pa0 due to noise is before the first peak Pa1 of the one preceding character and the level of peak Pa0 exceeds the specific level L1, peak Pa0 is mistakenly detected as the first peak, and the start character extraction position of the character waveform data for the one preceding character is wrong.

In this instance, the character recognition unit 80 looks in step SD1 for a peak exceeding the specific level L1 following (to the right in FIG. 6B) the position T1 of the peak Pa0 detected as the first peak of the one preceding character. Note that while the range in which a peak is detected in step SD1 is not specifically limited, the number of peaks detected is limited to the first peak that appears after position T1. In the example shown in FIG. 6B, the first peak Pa1 located next after peak Pa0 can be detected.

Whether or not a peak was detected in step SD1 is then determined in step SD2. If a peak was detected (step SD2 returns YES), the character recognition unit 80 goes to step SD3. If a peak was not detected (step SD2 returns NO), the character recognition unit 80 goes directly to step SA16 in FIG. 10.

Whether or not the current target character was recognized, that is, whether or not the target character was recognized in any of the first to fifth recognition phases described above, is determined in step SD3. If the target character was successfully recognized (step SD3 returns YES), the character recognition unit 80 goes to step SD4.

If the target character was not recognized (step SD3 returns NO), the character recognition unit 80 goes to step SD5. It is also possible in this instance that the character waveform data extraction position of the current target character was wrong because the character waveform data of the one preceding character was wrong.

Whether the peak detected as the first peak of the current target character is at a position a specific distance D2 or more from the position of the peak detected in step SD1 is determined in step SD4. More specifically, step SD4 determines whether first peak Pb1, which is the first peak in the current target character shown in FIG. 6B, is at a position T5 that is at least a specific distance D2 after (on the right side of) the position T4 of first peak Pa1 detected as the first peak of the one preceding character in step SD1.

If the position of the first peak in the current target character is in a range that is less than the minimum distance between magnetic ink characters 101 from the position of the first peak in the one preceding character, the first peak of the next character (the current target character) will be in the character waveform data of the one character when the character waveform data of the one preceding character is extracted. Because step SD3 has confirmed that the current target character was recognized in the recognition process of the first to fifth recognition phases, the start character extraction position is considered to be correct. Therefore, the position of the first peak in the one preceding character should be specific distance D2 or more from the position of the first peak of the target character, and the start character extraction position based on the first peak detected in step SD1 will be wrong if the first peak of the target character is in the extraction range of the character waveform data of the one preceding character.

In the example shown in FIG. 6B, the position of the first peak (first peak Pb1) of the current target character is after the position T5 separated specific distance D2 from the position T4 of the first peak (first peak Pa1) in the one preceding character. As a result, even if the start character extraction position of the one preceding character is determined and the character waveform data is extracted again based on the position of the first peak Pa1, the first peak Pb1 of the target character will not be in the extraction range of the character waveform data.

If the first peak of the current target character is at a position specific distance D2 or more from the position of the peak detected in step SD1 (step SD4 returns YES), the character recognition unit 80 goes to step SD5. If the first peak of the current target character is at a position less than specific distance D2 from the position of the peak detected in step SD1 (step SD4 returns NO), the character recognition unit 80 goes directly to step SA16 in FIG. 10.

In step SD5, the start character extraction position of the one preceding character is determined and character waveform data is extracted based on the position of the peak detected in step SD1, and character recognition is applied to the extracted character waveform data (character recognition is repeated). As a result, in the example shown in FIG. 6B, character waveform data is extracted using first peak Pa1 as the first peak and the character recognition process is repeated.

In step SD6, whether or not the character was recognized in the repeat recognition process of step SD5 is determined. If the character was recognized (step SD6 returns YES), the character recognition unit 80 goes to step SD7. If the character was not recognized (step SD6 returns NO), the character recognition unit 80 goes to step SA16 in FIG. 10.

Whether the character recognized as a result of the repeat recognition process in step SD5 is the number 2, number 5, or number 0 is then determined in step SD7. If the character recognized as a result of the repeat recognition process is the number 2, number 5, or number 0 (step SD7 returns YES), the character recognition unit 80 goes to step SD8. If the character recognized as a result of the repeat recognition process is not the number 2, number 5, or number 0 (step SD7 returns NO), the character recognition unit 80 goes to step SD10.

As described above, when character waveform data is extracted from the wrong position, the waveform may be mistakenly recognized as the number 0, number 2, or number 5, for example. Therefore, when the same recognition error occurs in the repeat recognition process, the result of a recognition error may be confirmed as the correct character if the result of the repeat recognition process is used with further testing. As a result, when the result of the repeat recognition process is the number 0, 2, or 5, at least of one embodiment checks for the possibility of a recognition error in step SD8.

As shown in FIG. 8, FIG. 9A, and FIG. 9B, the level of first peak P1 is greater than the level of second peak P2 in the reference waveform data for the number 2, number 5, and number 0. However, the level (absolute value) of the first negative peak M1 is lower than the level (absolute value) of the second negative peak M2. Therefore, if the level of the first positive peak P1 and the level of the second positive peak P2 in the extracted character waveform data are compared, the level of the first negative peak M1 and the level of the second negative peak M2 are compared, and the relationship therebetween is the reverse of the above, there is a strong possibility that the waveform data was extracted from the wrong extraction position. At least of one embodiment therefore checks for recognition errors by comparing the values of the positive peaks and negative peaks.

Step SD8 compares the level of the first positive peak P1 and the level of the second positive peak P2, and compares the level of the first negative peak M1 and the level of the second negative peak M2, in the character waveform data extracted in step SD5. In step SD9, the character recognition unit 80 then determines if the relationship between the positive peak and the negative peak levels is normal. "Normal" as used here means that the level of first peak P1 is greater than the level of second peak P2, and the level (absolute value) of the first negative peak M1 is less than the level (absolute value) of the second negative peak M2.

If the relationship between the levels of the positive peaks and negative peaks is normal (step SD9 returns YES), the character recognition unit 80 goes to step SD10.

In step SD10, the previous recognition result of the one preceding character is replaced with the result of the repeat recognition process in step SD5.

However, if the relationship between the levels of the positive peaks and negative peaks is not normal (step SD9 returns NO), the character recognition unit 80 goes to step SA16 in FIG. 10.

This completes the process of ignoring noise and repeating character recognition in step SB4, and completes the process of recognizing the one preceding character again in step SA15.

Referring again to FIG. 10, in step SA16, the character recognition unit 80 determines if the magnetic recognition process was completed, that is, if all magnetic ink characters 101 in the MICR line 100 were processed as the target character. If the magnetic recognition process was completed (step SA16 returns YES), the character recognition unit 80 goes to step SA17 in FIG. 11. If the magnetic recognition process is not completed (step SA16 returns NO), the character recognition unit 80 returns to step SA1 and magnetically recognizes the next target character.

Figure 11:
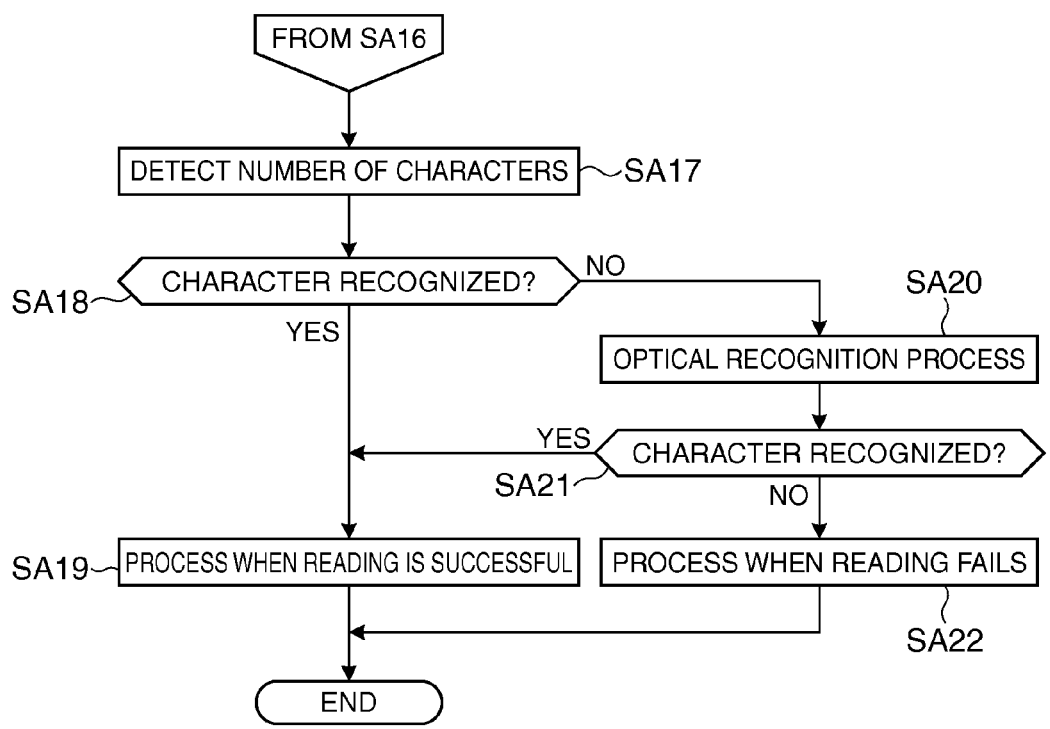
FIG. 11 is a flow chart describing an example of the character recognition process in a check reader.

In step SA17 in FIG. 11, the character recognition unit 80 detects the number of characters in the recognition string. In step SA18, the character recognition unit 80 determines if all characters contained in the recognition string, that is, all magnetic ink characters 101 in the MICR line 100, were recognized.

If all characters were recognized (step SA18 returns YES), the host-side control unit 73 determines that reading the MICR line 100 was successful and in step SA19 executes the process that is performed when the MICR line 100 is successfully read. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one character in the recognition string that could not be recognized (step SA18 returns NO), the character recognition unit 80 executes the optical recognition process in step SA20 to optically recognize target characters not recognized by magnetic recognition.

In the optical recognition process of step SA20, the character recognition unit 80 identifies the range of data corresponding to an image of the MICR line 100 in the data for the image of the check 4 front captured by the front contact image sensor 52, and extracts image data for each magnetic ink character 101. The character recognition unit 80 then optically recognizes the characters by comparing bitmap patterns for each of the 14 MICR characters with the extracted image data, and recognizes each of the magnetic ink characters 101.

The optical recognition process in step SA20 may recognize a target character that was not recognized in the magnetic recognition process based on the result of optical recognition, or provisionally recognize the character based on the result of optical recognition and confirm recognition if the provisionally recognized character matches the first candidate and second candidate used in the magnetic recognition process.

In step SA21, the character recognition unit 80 determines if all magnetic ink characters 101 that were not recognized by magnetic recognition were recognized by the optical recognition process in step SA20. If all magnetic ink characters 101 are recognized (step SA21 returns YES), the character recognition unit 80 executes the operation performed in step SA19 when the MICR line 100 is successfully read.

However, if there is even only one magnetic ink character that could not be recognized (step SA21 returns NO), the host-side control unit 73 executes the operation performed in step SA22 when reading the MICR line 100 fails. The operation performed when reading the MICR line 100 fails discharges the check 4 without printing an endorsement image, for example. The discharged check 4 is then examined to determine why reading failed, or is read again, for example.

The character recognition process of the check reader 1 according to at least of one embodiment ends as described above.

The effect of a recording media processing device, control method of a recording media processing device, and non-transitory storage medium storing a program according to at least of one embodiment as described above is described below.

(1) When the one magnetic ink character 101 preceding the target character is not recognized, at least of one embodiment detects a different peak in a specific range before and after the position of the peak previously detected as the first peak, and based on the position of the detected peak, extracts the character waveform data of the magnetic ink character 101 one before. As a result, when the reason the one preceding magnetic ink character 101 could not be recognized is because the first peak was mistakenly detected and the character waveform data was extracted from the wrong position, the correct first peak of the one preceding magnetic ink character 101 can be detected and the character waveform data can be extracted. By correctly extracting the character waveform data and repeating the magnetic recognition process, the one preceding magnetic ink character 101 can be recognized. As a result, the recognition rate of the magnetic recognition process can be improved.

(2) When attempting to detect the correct peak of the one preceding magnetic ink character 101, at least of one embodiment detects a peak with a level lower than the specific level L1 at which a peak was previously detected. As a result, this enables detecting the clipped first peak when the reason the correct first peak of the one preceding magnetic ink character 101 could not be detected is because the first peak was clipped by waveform distortion and is lower than the specific level L1. As a result, the magnetic recognition process can be applied to correctly extracted character waveform data.

(3) The magnetic ink character set includes characters, such as the number 1, number 4, amount symbol A, On-Us symbol O, and dash symbol D, in which the first peak is lower (the peak value of the first peak is lower) than the other characters. Compared with the other characters, clipping of the first peak by waveform distortion is more likely to result in the first peak of these characters being lower (the peak value of the first peak is lower) than the specific level L1. However, detecting a peak that is lower (the peak value is lower) than the specific level L1 increases the risk of mistakenly detecting a peak Pa0 caused by noise as the first peak. Therefore, by using the result of character recognition only when the character recognized as the one preceding magnetic ink character 101 by repeating the magnetic recognition process is a specific character, the risk of mistakenly recognizing a peak Pa0 caused by noise as the first peak and mistakenly extracting character waveform data based thereon can be suppressed.

(4) When the target character is recognized, the first peak of the target character was conceivably correctly detected and the character waveform data correctly extracted. In this instance, if the minimum distance between adjacent magnetic ink characters 101 is a specific distance D2, the position of the first peak in the one preceding magnetic ink character 101 should be at least this specific distance D2 from the position of the first peak of the target character. Therefore, because the invention extracts the character waveform data of the one preceding magnetic ink character 101 only when the distance between the position of the peak detected as the first peak of the one preceding magnetic ink character 101 and the position of the first peak of the target character is greater than or equal to specific distance D2, extracting character waveform data from the wrong extraction position can be suppressed.

A preferred embodiment of the invention is described above, but the invention is not limited thereto and can obviously be modified and adapted as desired within the scope of the invention.

For example, the magnetic recognition process has five magnetic recognition phases in the embodiment described above, but the invention is not so limited. The magnetic recognition process does not need to include all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The foregoing embodiment includes an optical recognition process, but the invention is not so limited. The optical recognition process may be omitted when a desired recognition rate is achieved in the magnetic recognition phase.

The functions of parts of the check reader 1 and the control method of the check reader 1 described in the foregoing embodiment can also be achieved by storing all or part of the foregoing program on a floppy disk, hard disk, optical disc, magneto-optical disc, Compact Disc, flash ROM, or other storage medium, and the CPU or other control unit of a computer or check reader 1 reading and executing the program from the storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording media processing device, comprising:
   a magnetic head configured to magnetically read a target magnetic ink character recorded on a recording medium; and
   a processor configured to
      detect a first peak exceeding a specific level in signal waveform data read and acquired by the magnetic head,
      extract character waveform data from the signal waveform data in a range corresponding to the target magnetic ink character based on a position of the detected first peak,
      apply a magnetic recognition process to the extracted character waveform data corresponding to the target magnetic ink character, and
      recognize the target magnetic ink character,
   wherein,
   when a preceding magnetic ink character before the target magnetic ink character is not recognized, the processor is configured to
      detect a different peak of the preceding magnetic ink character in a specific range before and after a position of a peak detected as a first peak of the preceding magnetic ink character in the signal waveform data,
      extract character waveform data corresponding to the preceding magnetic ink character from the signal waveform data based on a position of the detected different peak,
      repeat the magnetic recognition process on the extracted character waveform data corresponding to the preceding magnetic ink character to recognize the target magnetic ink character, and
      use the target magnetic ink character recognized in the repeated magnetic recognition process when the target magnetic ink character is recognized as at least one of a number 1, a number 4, an amount symbol A, a dash symbol D, or an On-Us symbol O.

2. The recording media processing device described in claim 1, wherein
   the processor is configured to detect a lower peak than the specific level applied to detect the first peak of the target magnetic ink character when detecting the different peak of the preceding magnetic ink character in the specific range.

3. The recording media processing device described in claim 1, wherein
   the processor is configured to extract character waveform data corresponding to the preceding magnetic ink character from the signal waveform data when
      the target magnetic ink character is recognized, and
      the position of the peak detected as the first peak of the preceding magnetic ink character is at a specific distance or more from the position of the peak detected as the first peak of the target magnetic ink character.

4. The recording media processing device described in claim 1, wherein a level of a first peak in signal waveform data of the number 4, the amount symbol A, the dash symbol D, and the number 1, and the On-Us symbol O is lower than a level of a first peak in signal waveform data of other magnetic ink characters in the E-13B MICR font.

5. The recording media processing device described in claim 1, wherein
   when the target magnetic ink character is at least one of a number 2, a number 5, or a number 0, the target magnetic ink character has first and second positive peaks and first and second negative peaks in signal waveform data of the target magnetic ink character, and
   the processor is further configured to
      compare levels of the first and second positive peaks and levels of the first and second negative peaks of the target magnetic ink character recognized in the repeated magnetic recognition process when the target magnetic ink character is recognized as at least one of a number 2, a number 5, or a number 0, and
      use the target magnetic ink character recognized in the repeated magnetic recognition process when the level of the first positive peak is greater than the level of the second positive peak, and the level of the first negative peak is less than the level of the second negative peak.

6. A method of controlling a recording media processing device that has
   a magnetic head that magnetically reads a target magnetic ink character recorded on a recording medium, and
   a processor that detects a first peak exceeding a specific level in signal waveform data read and acquired by the magnetic head, extracts character waveform data from the signal waveform data in a range corresponding to the target magnetic ink character based on a position of the detected first peak, applies a magnetic recognition process to the extracted character waveform data corresponding to the target magnetic ink character, and recognizes the target magnetic ink character,
   the method comprising:
   when a preceding magnetic ink character before the target magnetic ink character is not recognized,
      detecting a different peak of the preceding magnetic ink character in a specific range before and after a position of a peak detected as a first peak of the preceding magnetic ink character in the signal waveform data;
      extracting character waveform data corresponding to the preceding magnetic ink character from the signal waveform data based on a position of the detected different peak;
      repeating the magnetic recognition process on the extracted character waveform data corresponding to the preceding magnetic ink character to recognize the target magnetic ink character; and
      using the target magnetic ink character recognized in the repeated magnetic recognition process when the target magnetic ink character is recognized as at least one of a number 1, a number 4, an amount symbol A, a dash symbol D, or an On-Us symbol O.

7. The method described in claim 6, wherein
   the detecting the different peak includes detecting a lower peak than the specific level applied to detect the first peak of the target magnetic ink character when detecting the different peak in the specific range.

8. The method of described in claim 6, further comprising:
extracting character waveform data corresponding to the preceding magnetic ink character from the signal waveform data when
the target magnetic ink character is recognized, and
the position of the peak detected as the first peak of the preceding magnetic ink character is at a specific distance or more from the position of the peak detected as the first peak of the target magnetic ink character.

9. The method of described in claim 6, wherein a level of a first peak in signal waveform data of the number 4, the amount symbol A, the dash symbol D, and the number 1, and the On-Us symbol O is lower than a level of a first peak in signal waveform data of other magnetic ink characters in the E-13B MICR font.

10. The method of described in claim 6, wherein
when the target magnetic ink character is at least one of a number 2, a number 5, or a number 0, the target magnetic ink character has first and second positive peaks and first and second negative peaks in signal waveform data of the target magnetic ink character, and
the method further comprises
comparing levels of the first and second positive peaks and levels of the first and second negative peaks of the target magnetic ink character recognized in the repeated magnetic recognition process when the target magnetic ink character is recognized as at least one of a number 2, a number 5, or a number 0, and
using the target magnetic ink character recognized in the repeated magnetic recognition process when the level of the first positive peak is greater than the level of the second positive peak, and the level of the first negative peak is less than the level of the second negative peak.

11. A non-transitory storage medium storing a program for causing, when executed by a control unit of a recording media processing device that further has a magnetic head that magnetically reads a target magnetic ink character recorded on a recording medium, and a processor that detects a first peak exceeding a specific level in signal waveform data read and acquired by the magnetic head, extracts character waveform data from the signal waveform data in a range corresponding to the target magnetic ink character based on a position of the detected first peak, applies a magnetic recognition process to the extracted character waveform data corresponding to the target magnetic ink character, and recognizes the target magnetic ink character, the control unit to execute:
when a preceding magnetic ink character before a target magnetic ink character is not recognized,
detecting a different peak of the preceding magnetic ink character in a specific range before and after a position of a peak detected as a first peak of the preceding magnetic ink character in the signal waveform data;
extracting character waveform data corresponding to the preceding magnetic ink character from the signal waveform data based on a position of the detected different peak;
repeating the magnetic recognition process on the extracted character waveform data corresponding to the preceding magnetic ink character to recognize the target magnetic ink character; and
using the target magnetic ink character recognized in the repeated magnetic recognition process when the target magnetic ink character is recognized as at least one of a number 1, a number 4, an amount symbol A, a dash symbol D, or an On-Us symbol O.

12. The non-transitory storage medium described in claim 11, wherein
the detecting the different peak includes detecting a lower peak than the specific level applied to detect the first peak of the target magnetic ink character when detecting the different peak in the specific range.

13. The non-transitory storage medium described in claim 11, wherein the program, when executed by the control unit, further causes the control unit to execute:
extracting character waveform data corresponding to the preceding magnetic ink character from the signal waveform data when
the target magnetic ink character is recognized, and
the position of the peak detected as the first peak of the preceding magnetic ink character is at a specific distance or more from the position of the peak detected as the first peak of the target magnetic ink character.

14. The non-transitory storage medium described in claim 11, wherein a level of a first peak in signal waveform data of the number 4, the amount symbol A, the dash symbol D, and the number 1, and the On-Us symbol O is lower than a level of a first peak in signal waveform data of other magnetic ink characters in the E-13B MICR font.

15. The non-transitory storage medium described in claim 11, wherein
when the target magnetic ink character is at least one of a number 2, a number 5, or a number 0, the target magnetic ink character has first and second positive peaks and first and second negative peaks in signal waveform data of the target magnetic ink character, and
the program, when executed by the control unit, further causes the control unit to execute:
comparing levels of the first and second positive peaks and levels of the first and second negative peaks of the target magnetic ink character recognized in the repeated magnetic recognition process when the target magnetic ink character is recognized as at least one of a number 2, a number 5, or a number 0, and
using the target magnetic ink character recognized in the repeated magnetic recognition process when the level of the first positive peak is greater than the level of the second positive peak, and the level of the first negative peak is less than the level of the second negative peak.

* * * * *